US011983926B2

(12) United States Patent
Li et al.

(10) Patent No.: US 11,983,926 B2
(45) Date of Patent: May 14, 2024

(54) VIDEO CONTENT RECOGNITION METHOD AND APPARATUS, STORAGE MEDIUM, AND COMPUTER DEVICE

(71) Applicant: Tencent Technology (Shenzhen) Company Limited, Shenzhen (CN)

(72) Inventors: Yan Li, Shenzhen (CN); Bin Ji, Shenzhen (CN); Xintian Shi, Shenzhen (CN); Bin Kang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 294 days.

(21) Appl. No.: 17/674,688

(22) Filed: Feb. 17, 2022

(65) Prior Publication Data
US 2022/0172477 A1 Jun. 2, 2022

Related U.S. Application Data

(63) Continuation of application No. PCT/CN2020/122152, filed on Oct. 20, 2020.

(30) Foreign Application Priority Data

Jan. 8, 2020 (CN) .......................... 202010016375.2

(51) Int. Cl.
*G06V 20/40* (2022.01)
*G06V 10/80* (2022.01)
*G06V 10/82* (2022.01)

(52) U.S. Cl.
CPC .............. *G06V 20/46* (2022.01); *G06V 10/80* (2022.01); *G06V 10/82* (2022.01)

(58) Field of Classification Search
CPC ........ G06V 20/46; G06V 10/80; G06V 10/82; G06V 10/443; G06V 10/806; G06V 20/41; G06F 18/253
See application file for complete search history.

(56) References Cited

U.S. PATENT DOCUMENTS

2011/0182469 A1  7/2011  Ji et al.
2016/0007058 A1  1/2016  Wang et al.
(Continued)

FOREIGN PATENT DOCUMENTS

CN   108319905 A   7/2018
CN   108388876 A   8/2018
(Continued)

OTHER PUBLICATIONS

Tencent Technology, ISR, PCT/CN2020/122152, Jan. 18, 2021, 3 pgs.
(Continued)

*Primary Examiner* — Xuemei G Chen
(74) *Attorney, Agent, or Firm* — Morgan, Lewis & Bockius LLP

(57) ABSTRACT

A video content recognition method is performed by a computer device, the method including: obtaining an image feature corresponding to a video frame set extracted from a target video; dividing the image feature into a plurality of image sub-features according to a preset sequence, and each image sub-feature having a corresponding channel; choosing, from the image sub-features based on the preset sequence, a current image sub-feature; image sub-feature fusing the current image sub-feature and a convolution processing result of a previous image sub-feature into a fused image sub-feature, and performing convolution processing on the fused image sub-feature, to obtain a convolved image sub-feature corresponding to the current image sub-feature; splicing a plurality of convolved image sub-features corresponding to the plurality of channels of the convolved image sub-feature, to obtain a spliced image feature; and determining video content corresponding to the target video based on the spliced image feature.

20 Claims, 9 Drawing Sheets

(56) References Cited

U.S. PATENT DOCUMENTS

| | | | |
|---|---|---|---|
| 2019/0244028 A1 | 8/2019 | Jones et al. | |
| 2020/0210843 A1* | 7/2020 | Tao | G06N 3/045 |
| 2020/0311453 A1* | 10/2020 | Li | G06V 10/764 |
| 2020/0364486 A1* | 11/2020 | Park | G06T 5/20 |
| 2021/0133457 A1* | 5/2021 | Zhang | G06F 18/253 |
| 2021/0200993 A1* | 7/2021 | Chen | G06F 18/213 |
| 2021/0326597 A1* | 10/2021 | Yi | G06V 10/82 |
| 2021/0390289 A1* | 12/2021 | Yang | G06V 10/82 |
| 2022/0004808 A1* | 1/2022 | Yuan | G06V 10/26 |
| 2022/0188999 A1* | 6/2022 | Wang | G06T 7/162 |

FOREIGN PATENT DOCUMENTS

| | | | |
|---|---|---|---|
| CN | 109829392 A | | 5/2019 |
| CN | 110210278 A | | 9/2019 |
| CN | 110210311 A | | 9/2019 |
| CN | 110287875 A | | 9/2019 |
| CN | 110348537 A | | 10/2019 |
| CN | 110557679 A | | 12/2019 |
| CN | 111241985 A | | 6/2020 |
| CN | 112215332 A | * | 1/2021 ........... G06N 3/0454 |

OTHER PUBLICATIONS

Tencent Technology, WO, PCT/CN2020/122152, Jan. 18, 2021, 5 pgs.
Tencent Technology, IPRP, PCT/CN2020/122152, Jul. 12, 2022, 6 pgs.
Extended European Search Report, EP20911536.9, dated Oct. 26, 2022, 12 pgs.
Pingchuan Ma, et al., "Learning Efficient Video Representation with Video Shuffle Networks", Cornell University Library, Nov. 26, 2019, XP081539636, 9 pgs.
Shuiwang Ji, et al., "3D Convolutional Neural Networks for Human Action Recognition", IEEE Transactions on Pattern Analysis and Machine Intelligence, vol. 35, No. 1, Jan. 1, 2013, XP011490774, 11 pgs.
Yang Du, et al., "Interaction-Aware Spatio-Temporal Pyramid Attention Networks for Action Classification", 2015 18$^{th}$ International Conference, Austin, TX, Oct. 6, 2018, XP047488487, 17 pgs.

* cited by examiner

VIDEO CONTENT RECOGNITION METHOD AND APPARATUS, STORAGE MEDIUM, AND COMPUTER DEVICE

CROSS-REFERENCE TO RELATED APPLICATIONS

This application is a continuation application of PCT Patent Application No. PCT/CN2020/122152, entitled "VIDEO CONTENT RECOGNITION METHOD AND APPARATUS, STORAGE MEDIUM, AND COMPUTER DEVICE" filed on Oct. 20, 2020, which claims priority to Chinese Patent Application No. 202010016375.2, filed with the State Intellectual Property Office of the People's Republic of China on Jan. 8, 2020, and entitled "VIDEO CONTENT RECOGNITION METHOD AND APPARATUS, STORAGE MEDIUM, AND ELECTRONIC DEVICE", all of which are incorporated herein by reference in their entirety.

FIELD OF THE TECHNOLOGY

This application relates to the field of computer technologies, and in particular, to a video content recognition method and apparatus, a storage medium, and a computer device.

BACKGROUND OF THE DISCLOSURE

With the research and progress of artificial intelligence (AI) technologies, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

As an information propagation manner with a video as a carrier is increasingly popular, various video-related applications are also greatly developed. Therefore, higher requirements are put forward for video-related technologies, and recognition of video content, as a basic task in a video processing technology, has received an increasing attention. However, in the prior art, a correlation between a current video frame and a distant video frame is established through a large quantity of convolution operations, to recognize video content, and such a video content recognition method has low efficiency.

SUMMARY

A video content recognition method is performed by a computer device, the method including:
  obtaining an image feature corresponding to a video frame set extracted from a target video, the video frame set comprising at least two video frames;
  dividing the image feature into a plurality of image sub-features based on a plurality of channels of the image feature according to a preset sequence, and each image sub-feature comprising a feature of each video frame on a corresponding channel;
  choosing, from the plurality of image sub-features based on the preset sequence, a current image sub-feature;
  fusing the current image sub-feature and a convolution processing result of a previous image sub-feature into a fused image sub-feature, and performing convolution processing on the fused image sub-feature, to obtain a convolved image sub-feature corresponding to the current image sub-feature;
  splicing a plurality of convolved image sub-features corresponding to the plurality of channels of the convolved image sub-feature, to obtain a spliced image feature; and
  determining video content corresponding to the target video based on the spliced image feature.

One or more non-transitory computer-readable storage media storing computer-readable instructions are provided, the computer-readable instructions, when executed by one or more processors of a computer device, causing the computer device to perform operations of the video content recognition method.

A computer device is provided, including a memory and one or more processors, the memory storing computer-readable instructions, the computer-readable instructions, when executed by the one or more processors, causing the computer device to perform operations of the video content recognition method.

BRIEF DESCRIPTION OF THE DRAWINGS

To describe the technical solutions in the embodiments of this application more clearly, the following briefly describes accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

Figure 1:
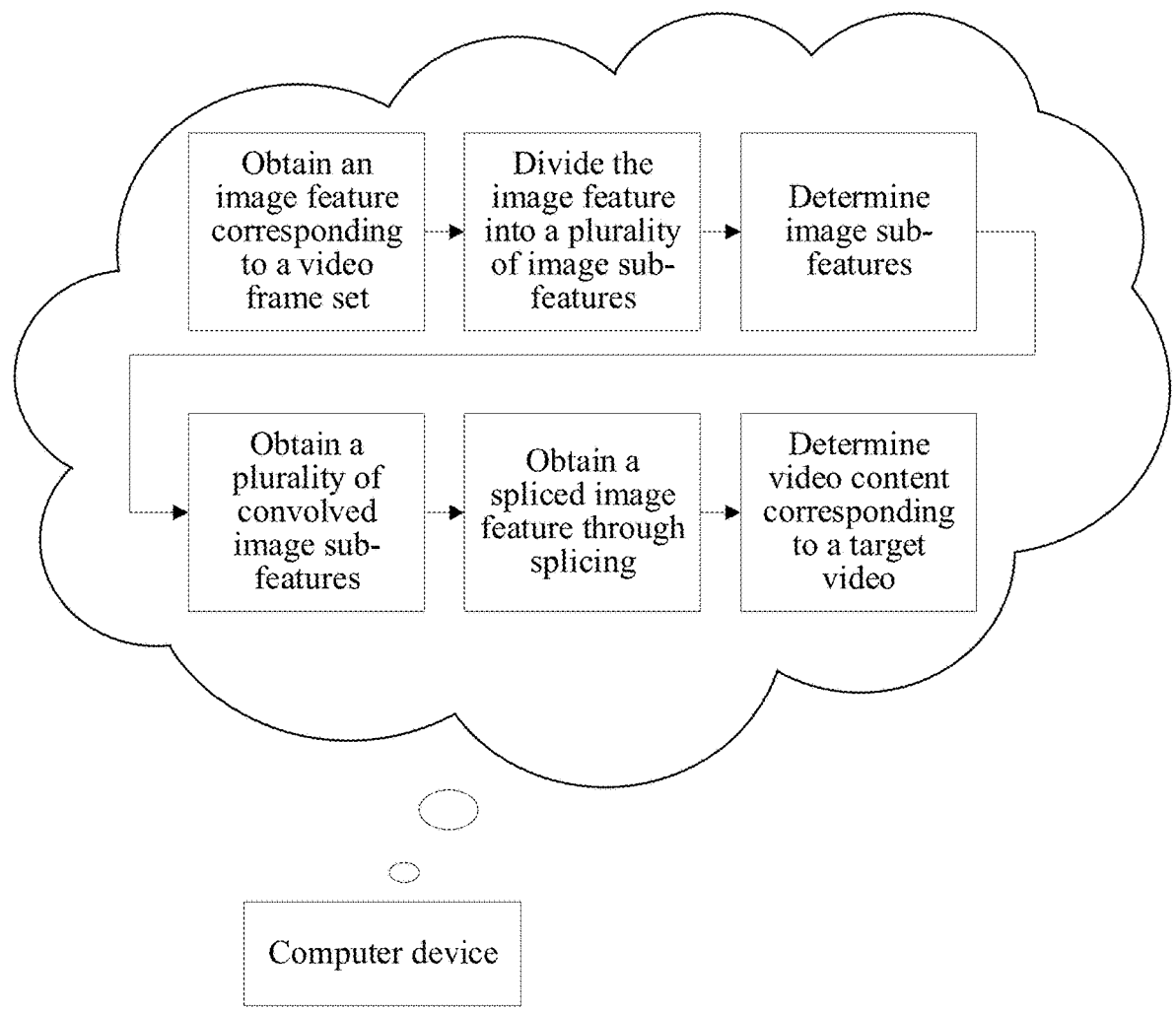
FIG. 1 is a schematic diagram of a scenario of a video content recognition system according to an embodiment of this application.

Referring to the drawings, same component symbols represent same components. A principle of this application is described by using examples in which this application is implemented in proper computing environments. The following descriptions are specific embodiments of this application based on the examples, and are not to be construed as a limitation to other specific embodiments of this application that are not described herein in detail.

In the following description, the specific embodiments of this application are described with reference to steps and symbols of operations that are performed by one or more computers, unless indicated otherwise. Therefore, such steps and operations, which are at times referred to as being computer-executed, include the manipulation by the processing unit of the computer of electrical signals representing data in a structured form. This manipulation transforms the data or maintains the data at locations in the memory system of the computer, which reconfigures or otherwise alters the operation of the computer in a manner well understood by a person skilled in the art. Data structures in which the data is maintained are physical locations of the memory that have particular properties defined by the format of the data. However, while the principle of this application is being described in the foregoing text, it is not meant to be limiting as a person skilled in the art will appreciate that the various steps and operations described hereinafter may be implemented in hardware.

A term "module" used in the specification may be considered as a software object executed in the calculation system. Different components, modules, engines, and services described in the specification may be considered as objects implemented in the calculation system. The apparatus and method described in the specification may be implemented in a form of software, and definitely can be implemented in a form of hardware, both of which fall within the protection scope of this application. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In this application, the terms "first", "second", "third", and the like are intended to distinguish between different objects but do not indicate a particular order. In addition, the terms "include", "have", and any variant thereof are intended to cover a non-exclusive inclusion. For example, a process, method, system, product, or device that includes a series of steps or modules is not limited to the listed steps or modules. Instead, some embodiments further include a step or module that is not listed, or some embodiments further include another step or module that is intrinsic to the process, method, product, or device.

"Embodiment" mentioned in the specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

An embodiment of this application provides a video content recognition method. The video content recognition method may be performed by a video content recognition apparatus provided in an embodiment of this application, or a computer device integrated with the video content recognition apparatus. The video content recognition apparatus may be implemented in manner of hardware or software. The computer device may be a device such as a smartphone, a tablet computer, a palmtop computer, a notebook computer, or a desktop computer. The computer device includes, but is not limited to, a computer, a network host, a single network server, a plurality of network server sets, or a cloud formed by a plurality of servers.

FIG. 1 is a schematic diagram of an application scenario of a video content recognition method according to an embodiment of this application. For example, a video content recognition apparatus is integrated into a computer device. The computer device may obtain a video frame set from a target video, and extract an image feature corresponding to the video frame set, the video frame set including at least two video frames; divide the image feature into a plurality of image sub-features based on a plurality of channels of the image feature, the plurality of image sub-features being arranged according to a preset sequence, and each image sub-feature including a feature of each video frame on a corresponding channel; determine image sub-features from the plurality of image sub-features based on the preset sequence, fuse a current image sub-feature and a convolution processing result of a previous image sub-feature, and perform convolution processing on a fused image feature, to obtain a convolved image sub-feature corresponding to each image sub-feature; and splice a plurality of convolved image sub-features based on a plurality of channels of the convolved image sub-features, to obtain a spliced image feature, and determine video content corresponding to the target video based on the spliced image feature.

The video content recognition method provided in this embodiment of this application relates to a computer vision (CV) direction in the field of artificial intelligence (AI). In this embodiment of this application, an image feature corresponding to a plurality of video frames in a target video may be extracted by using a video action recognition technology, the image feature is divided into a plurality of image sub-features, and then a plurality of times of convolution processing and a plurality of times of fusion processing are performed on the plurality of image sub-features, to expand a receptive field of the image feature in a temporal dimension, thereby predicting video content corresponding to the target video.

AI is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making. The AI technology is a comprehensive discipline, and relates to a wide range of fields including both hardware-level technologies and software-level technologies. AI software technologies mainly include directions such as a CV technology, and machine learning (ML)/deep learning.

The CV is a science that studies how to use a machine to "see", and furthermore, refers to using a computer to replace human eyes for performing machine vision, such as recognition and measurement, on a target, and further perform image processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The CV technologies usually include technologies such as image processing and image recognition, and further include biological feature recognition technologies such as common face recognition and human pose recognition.

Figure 2:
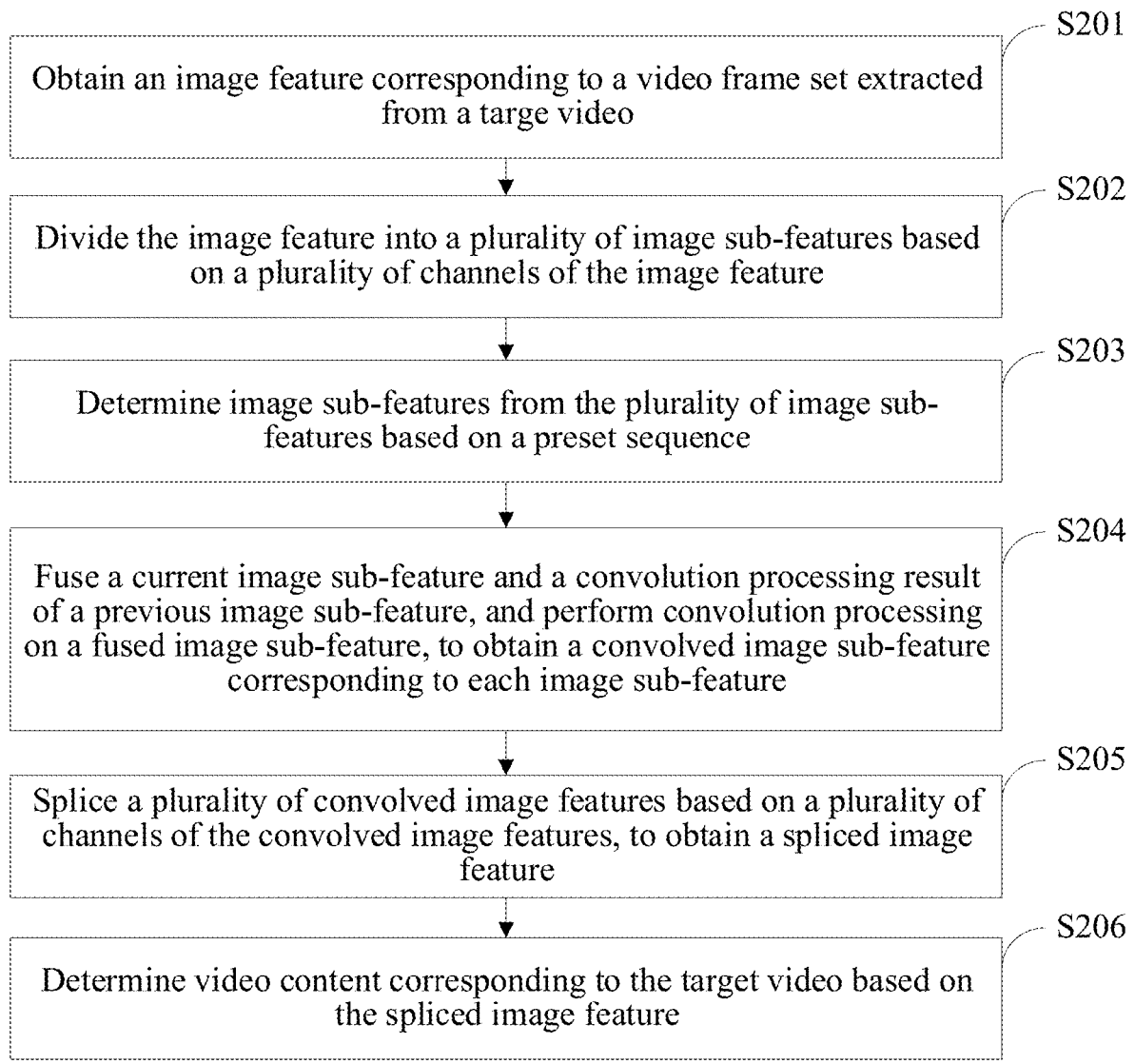
FIG. 2 is a flowchart of a video content recognition method according to an embodiment of this application.

FIG. 2 is a schematic flowchart of a video content recognition method according to an embodiment of this application. The method may be performed by a computer device, which is specifically described by using the following embodiments.

S201. Obtain an image feature corresponding to a video frame set extracted from a target video.

When video content corresponding to a video is recognized, complete information in the video within a period of time needs to be analyzed, so that the video content expressed by the video can be more accurately determined. For example, if a character in the video is swimming, but if only a single video frame in the video is analyzed, it can be only determined that the video content of the video is that the character is swimming. If a plurality of video frames are selected from the video within a period of video time for analysis, more detailed content information such as a swimming stroke of a swimmer in the video may be determined. Therefore, when the video content corresponding to the video is recognized, a plurality of video frames in the video need to be obtained.

In an actual application, for example, a video A of which video content needs to be recognized may be determined as a target video. Because video content corresponding to the target video needs to be comprehensively determined according to information about the target video within a period of video time, at least two video frames may be obtained from the video A, and a video frame set is constructed according to a plurality of obtained video frames.

In an embodiment, to ensure that the information about the target video within the period of video time can be restored relatively completely by using a plurality of video frames obtained from the target video, the target video may be divided, and each divided target sub-video is sampled, to obtain the plurality of video frames. Specifically, the step of "obtaining a video frame set from a target video, and extracting an image feature corresponding to the video frame set" may include:

determining the target video;
dividing the target video into a plurality of target sub-videos;
obtaining a video frame from each target sub-video, and constructing the video frame set based on a plurality of video frames; and
extracting features of the video frame set, to obtain the image feature corresponding to the video frame set.

In an actual application, for example, a video A of which video content needs to be recognized may be determined as a target video, and the video A is divided into a plurality of target sub-videos. Each target sub-video is a video segment of the video A. Subsequently, a video frame is obtained from each target sub-video, that is, each video frame corresponds to a target sub-video, and a video frame set is constructed according to a plurality of obtained video frames. Feature extraction is then performed on the video frame set by using a feature extraction method such as a convolution operation, and an image feature corresponding to the video frame set is extracted. The image feature includes a feature corresponding to each video frame.

In an embodiment, in an actual application process, only video content of a video segment in the target video may need to be recognized. For example, when the target video is a movie A, only video content corresponding to a video segment between the $20^{th}$ minute and the $25^{th}$ minute in the movie A may need to be recognized. Therefore, in this case, a target video segment requiring video recognition may be determined from the target video, the target video segment is divided into a plurality of target sub-videos, and then subsequent steps are performed.

In an embodiment, there may be a plurality of methods for obtaining a video frame from a target sub-video. For example, random sampling may be performed on a target sub-video, to obtain a video frame corresponding to the target sub-video. In another example, the first video frame in the target sub-video may alternatively be used as a video frame corresponding to the target sub-video. In another example, a video frame at a moment in the middle of the entire target sub-video may alternatively be used as a video frame corresponding to the target sub-video according to a video duration of the target sub-video. That is, as long as it is ensured that different video frames come from different target sub-videos.

In an embodiment, to obtain a video frame sequence with a fixed length from a target video without a fixed duration, the target video may be divided according to a preset image quantity of video frames that need to be obtained. Specifically, the step of "dividing the target video into a plurality of target sub-videos" may include:

determining a preset image quantity;
determining a sub-video duration corresponding to each target sub-video based on the preset image quantity and a video duration of the target video; and
dividing the target video into the plurality of target sub-videos based on the sub-video duration.

In an actual application, for example, to obtain a video frame sequence with a fixed length from a target video without a fixed duration, the length of the video frame sequence that needs to be obtained may be first determined, that is, a preset image quantity T of video frames that need to be obtained is determined. If a video duration of the target video is m minutes, in this case, it may be determined that a sub-video duration corresponding to each target sub-video that needs to be obtained is $$\frac{m}{T}$$

minutes, and then the entire target video may be divided into T target sub-videos on average according to the sub-video duration.

In an embodiment, there may be a plurality of video division methods for dividing the target video into the plurality of target sub-videos. For example, as described above, the target video may be divided into a plurality of target sub-videos with a same duration on average according to the preset image quantity. In another example, a sub-video duration corresponding to a target sub-video that needs to be obtained may alternatively be first determined, and the target video is divided according to the sub-video duration. In this case, a relatively large quantity of video frames may be obtained for a target video with a relatively long video duration, and a relatively small quantity of video frames may be obtained for a target video with a relatively short video duration.

In an actual application, for example, a video A of which video content needs to be recognized may be determined as a target video. In this case, a video duration of the video A is 24 s, and a preset image quantity is 8, so that the video A may be divided into eight target sub-videos with a sub-video duration of 3 s on average, and random sampling is performed on each target sub-video, to obtain a video frame set. The video frame set includes eight video frames obtained through sampling. Subsequently, feature extraction may be performed on the video frame set, to obtain an image feature corresponding to the video frame set.

S202. Divide the image feature into a plurality of image sub-features based on a plurality of channels of the image feature.

In deep learning, a quantity of channels corresponding to a feature may represent a quantity of convolution kernels in a convolutional layer. For example, an input image feature includes three channels, and a quantity of convolution kernels is 10, so that an output image feature may be obtained after convolution processing is performed on the input image feature by using 10 convolution kernels. The output image feature includes 10 channels. In this case, a quantity of channels in the output image feature is the same as the quantity of convolution kernels.

In an actual application, for example, X may be used for representing an image feature, [T, C, H, W] may be used for representing sizes of feature dimensions. T represents a temporal dimension, that is, there are T video frames in a video frame set in total, C represents a quantity of channels, and H and W represent a spatial dimension of the feature. If the image feature is divided into four image sub-features, feature dimensions corresponding to each image sub-feature are changed into $$\left[T, \frac{C}{4}, H, W\right].$$

Figure 8:
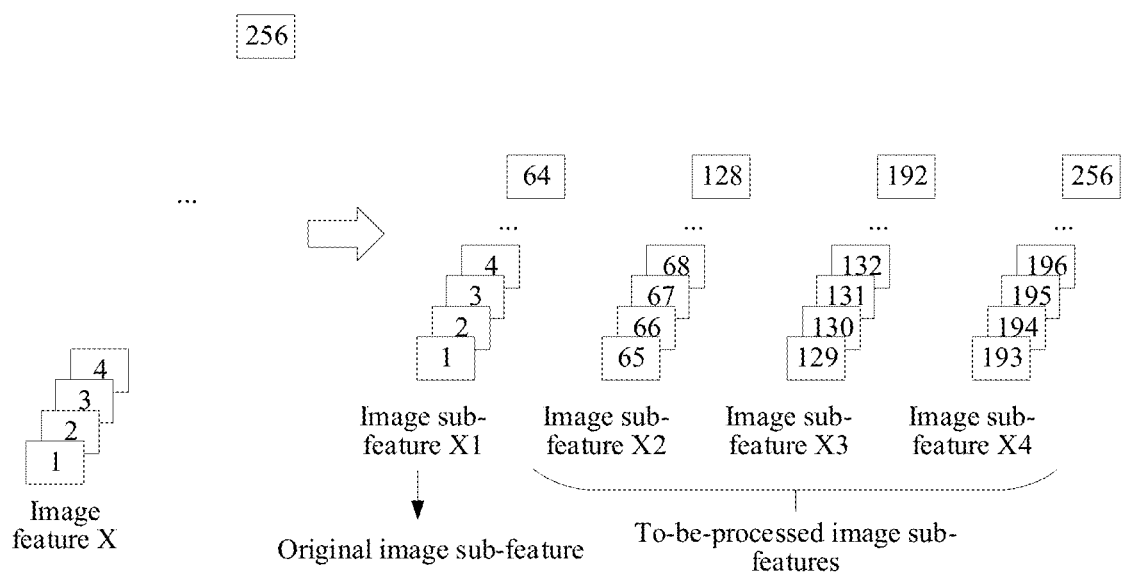
FIG. 8 is a schematic diagram of splitting an image feature according to an embodiment of this application.

In an embodiment, the plurality of image sub-features are arranged according to a preset sequence. Each image sub-feature includes a feature of each video frame on a corresponding channel. For example, as shown in FIG. 8, a video frame set may be extracted from a target video, the video frame set including eight video frames. An image feature X corresponding to the video frame set is obtained based on a plurality of times of convolution operations, the image feature X including features corresponding to the eight video frames and the image feature X being corresponding to 256 channels that are arranged according to a sequence from a channel 1 to a channel 256. Therefore, a quantity of image sub-features that need to be obtained may be determined as 4, the channel 1 to the channel 256 corresponding to the image feature X are then divided into four parts on average: the channel 1 to the channel 64, the channel 65 to the channel 128, the channel 129 to the channel 192, and the channel 193 to the channel 256, and four image sub-features are obtained based on a result of division: an image sub-feature X1, an image sub-feature X2, an image sub-feature X3, and an image sub-feature X4. The four image sub-features are arranged according to a preset sequence. The image sub-feature X1 is an image sub-feature corresponding to the channel 1 to the channel 64, the image sub-feature X2 is an image sub-feature corresponding to the channel 65 to the channel 128, the image sub-feature X3 is an image sub-feature corresponding to the channel 129 to the channel 192, and the image sub-feature X4 is an image sub-feature corresponding to the channel 193 to the channel 256. Each image sub-feature includes the features corresponding to the eight video frames. The quantity of image sub-features that need to be obtained may be adjusted according to an actual situation. The quantity of image sub-features is not specifically limited in this embodiment of this application.

S203. Determine a image sub-feature from the plurality of image sub-features based on the preset sequence.

A receptive field may be expanded for a feature after convolution processing, that is, features within a longer time range may be fused. Therefore, some image sub-features need to be selected from a plurality of image sub-features as image sub-features, and convolution processing needs to be performed on the image sub-features, to obtain convolved image sub-features. The convolved image sub-features include features corresponding to all the video frames in the video frame set, and a feature of a video frame adjacent to a corresponding video frame is further fused into a feature corresponding to each video frame. That is, compared with the original image sub-features, the receptive field is expanded and the features are enriched for the convolved image sub-features.

In an actual application, for example, as shown in FIG. 8, after the image sub-feature X1, the image sub-feature X2, the image sub-feature X3, and the image sub-feature X4 that are arranged in sequence are obtained, the image sub-feature X2, the image sub-feature X3, and the image sub-feature X4 may be determined as image sub-features according to the preset sequence. The image sub-features may be adjusted according to a requirement of the actual application. For example, the image sub-features determined from the plurality of image sub-features vary with different preset sequences.

S204. Fuse a current image sub-feature and a convolution processing result of a previous image sub-feature, and perform convolution processing on a fused image feature, to obtain a convolved image sub-feature corresponding to each image sub-feature.

One time of convolution processing can expand only a limited number times of the receptive field. For example, if an initial feature includes a feature of an image 1, a feature of an image 2, and a feature of an image 3 that are arranged in sequence, and a size of a convolution kernel is 3 in one-dimensional convolution. After convolution processing is performed on the initial feature by using the convolution kernel, a processed feature may be obtained. The processed feature includes the features corresponding to the three images. However, in this case, the feature corresponding to the image 2 in the processed feature is further fused with the feature of the image 1 and the feature of the image 3, and a receptive field of the processed feature is expanded in a temporal dimension relative to the initial feature, but only an effect of fusing features of two adjacent images can be achieved.

Therefore, if information within a long time range needs to be fused by using a conventional method, a deep neural network needs to be used, and a plurality of convolutions are stacked. However, the method has an optimization problem. In the deep neural network, a correlation between a video frame and a distant video frame may be established only when a large quantity of local convolution operations need to be performed on the video frame. Therefore, whether information about a current video frame is transmitted to a distant video frame or a signal of a distant video frame is fed back to a current video frame, a distant signal transmission process is required, and effective information is easily weakened during information transmission. As a result, an effective temporal correlation between two distant video frames cannot be established.

Therefore, a feature of which a receptive field has been expanded may be fused with a current image sub-feature requiring convolution processing by using a feature fusion mechanism, so that before the convolution processing, a receptive field of the current image sub-feature has been expanded, the receptive field of the feature is then expanded again through the convolution processing, and the feature of which the receptive field is expanded again is fused with a next image sub-feature requiring convolution processing, and so on. Therefore, receptive fields in a temporal dimension corresponding to features can be expanded continuously, to finally fuse the features within a longer time range.

In an embodiment, the step of "fusing a current image sub-feature and a convolution processing result of a previous image sub-feature, and performing convolution processing on a fused image feature, to obtain a convolved image sub-feature corresponding to each image sub-feature" may include:
  determining an initial image sub-feature from a plurality of image sub-features based on the preset sequence;
  performing convolution processing on the initial image sub-feature, to obtain a convolved image sub-feature;
  determining the current image sub-feature from the plurality of image sub-features based on the preset sequence and the initial image sub-feature;
  fusing the current image sub-feature and the convolved image sub-feature, to obtain a fused image feature;
  updating the fused image feature as the initial image sub-feature; and
  repeating the operations of performing convolution processing on the initial image sub-feature, to obtain a convolved image sub-feature, until the convolved image sub-feature corresponding to each image sub-feature is obtained.

Figure 9:
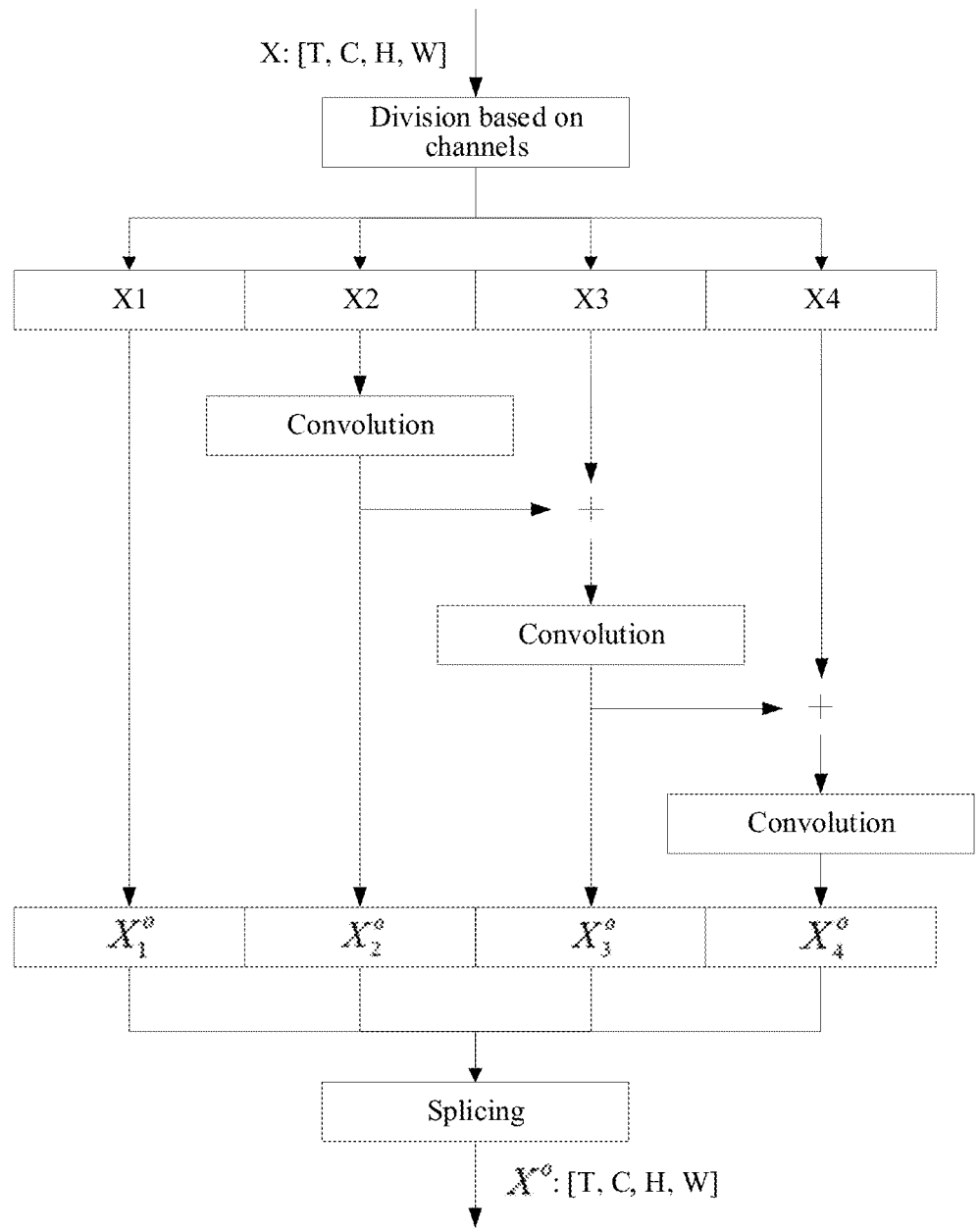
FIG. 9 is a schematic logic diagram of a multiple temporal aggregation sub-model according to another embodiment of this application.

In an actual application, for example, as shown in FIG. 9, a plurality of image sub-features have been determined from the image sub-feature X1, the image sub-feature X2, the image sub-feature X3, and the image sub-feature X4 that are arranged in sequence, which are the image sub-feature X2, the image sub-feature X3, and the image sub-feature X4. The image sub-feature X2 may be determined as an initial image sub-feature according to the preset sequence, and convolution processing is performed on the image sub-feature X2, to obtain a convolved image sub-feature $X_2^0$ corresponding to the image sub-feature X2.

After the image sub-feature X2 is processed, the image sub-feature X3 may be determined as a current image sub-feature, the convolved image sub-feature $X_2^0$ corresponding to the image sub-feature X2 and the image sub-feature X3 are fused by addition in a connection manner similar to a residual connection, to obtain a fused image feature corresponding to the image sub-feature X3, and then convolution processing is performed on the fused image feature corresponding to the image sub-feature X3, to obtain a convolved image sub-feature $X_2^0$ corresponding to the image sub-feature X3.

After the image sub-feature X3 is processed, the image sub-feature X4 may be determined as a current image sub-feature, the convolved image sub-feature $X_2^0$ corresponding to the image sub-feature X3 and the image sub-feature X4 are fused by addition in a connection manner similar to a residual connection, to obtain a fused image feature corresponding to the image sub-feature X4, and then convolution processing is performed on the fused image feature corresponding to the image sub-feature X4, to obtain a convolved image sub-feature $X_4^0$ corresponding to the image sub-feature X4. In this case, convolution processing is performed on all the image sub-features, and convolved image sub-features corresponding to the image sub-features are all obtained. It indicates that the circulation steps may be ended.

Figure 10:
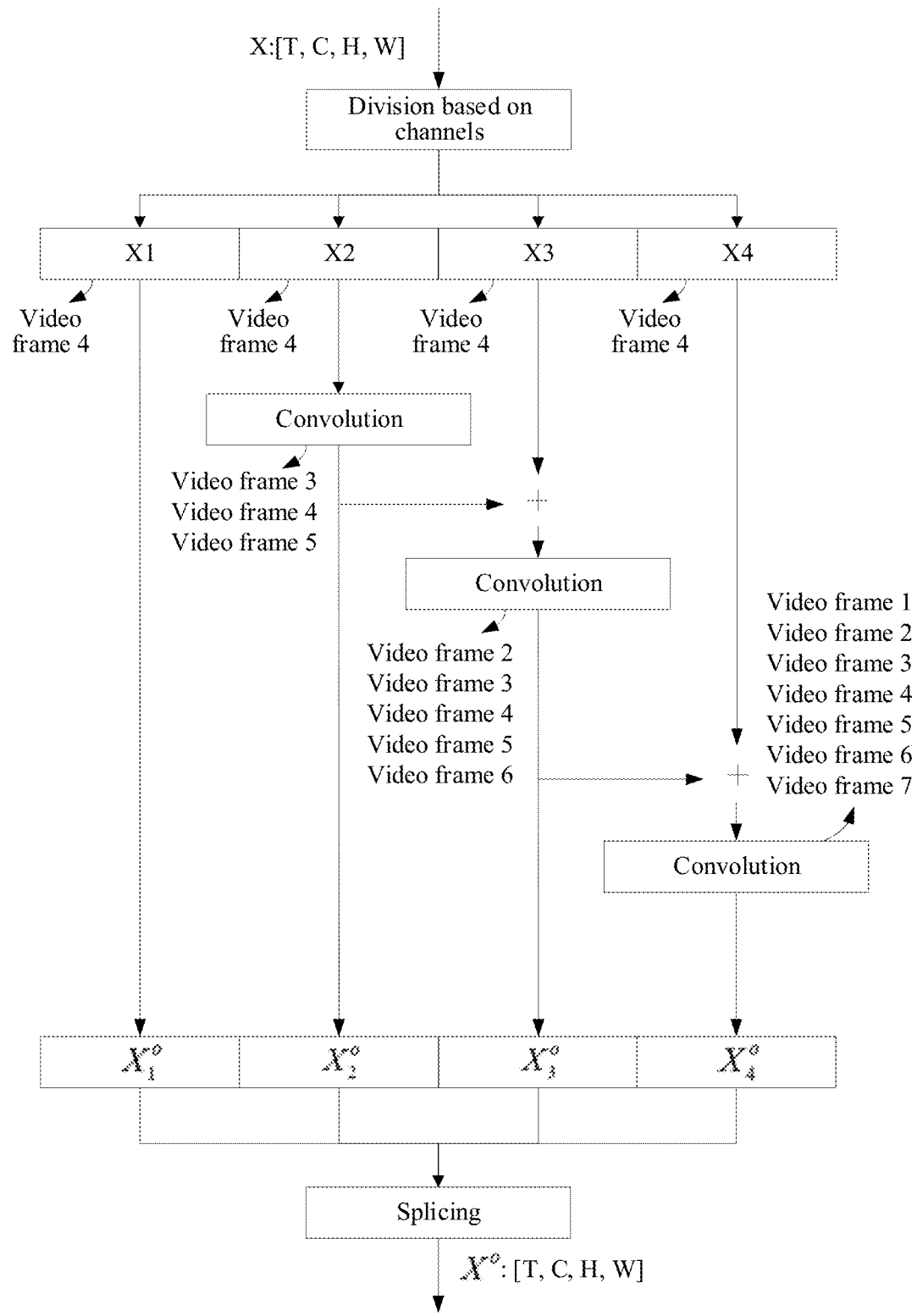
FIG. 10 is a schematic logic diagram of a multiple temporal aggregation sub-model according to still another embodiment of this application.

If the video frame set includes T video frames, each image sub-feature includes features corresponding to the T video frames. The fourth video frame (a video frame 4) is used as an example for description herein. As shown in FIG. 10, that is, an image sub-feature X1, an image sub-feature X2, an image sub-feature X3, and an image sub-feature X4 includes a feature corresponding to the video frame 4. After convolution processing is performed on the image sub-feature X2, in a convolved image sub-feature $X_2^0$ corresponding to the image sub-feature X2, the feature of the video frame 4 is fused with features of a video frame 3 and a video frame 5. In this case, a receptive field of the convolved image sub-feature $X_2^0$ corresponding to the image sub-feature X2 is expanded once.

The convolved image sub-feature $X_2^0$ corresponding to the image sub-feature X2 and the image sub-feature X3 are fused by addition. After convolution processing is performed on a fused image feature corresponding to the image sub-feature X3, in a convolved image sub-feature $X_3^0$ corresponding to the image sub-feature X3, the feature of the video frame 4 is fused with features of a video frame 2, the video frame 3, the video frame 5, and a video frame 6. In this case, a receptive field of the convolved image sub-feature $X_3^0$ corresponding to the image sub-feature X3 is expanded twice.

The convolved image sub-feature $X_3^0$ corresponding to the image sub-feature X3 and the image sub-feature X4 are fused by addition. After convolution processing is performed on a fused image feature corresponding to the image sub-feature X4, in a convolved image sub-feature $X_4^0$ corresponding to the image sub-feature X4, the feature of the video frame 4 is fused with features of a video frame 1, the video frame 2, the video frame 3, the video frame 5, the video frame 6, and a video frame 7. In this case, a receptive field of the convolved image sub-feature $X_4^0$ corresponding to the image sub-feature X4 is expanded three times, so that a correlation between the feature and a distant video frame can be effectively established.

In an embodiment, convolution processing may be performed on a feature by using a mixed convolution model, to expand a receptive field. Specifically, the step of "performing convolution processing on the initial image sub-feature, to obtain a convolved image sub-feature" may include:
  determining an initially mixed convolution model;
  dividing the initially mixed convolution model into a plurality of mixed convolution models based on the plurality of channels of the image feature; and
  performing convolution processing on the initial image sub-feature based on the mixed convolution model, to obtain the convolved image sub-feature.

The initially mixed convolution model may be a (2+1)D convolution model. The (2+1)D convolution model may include two parts, which are respectively a one-dimensional convolution sub-model and a two-dimensional convolution sub-model. For example, the initially mixed convolution model may include a one-dimensional convolution sub-model in a temporal dimension, a size of a convolution kernel of the one-dimensional convolution sub-model being 3, and a two-dimensional convolution sub-model in a spatial dimension, a size of a convolution kernel of the two-dimensional convolution sub-model being 3*3. Convolution processing is performed by using the (2+1)D convolution model, so that modeling for a temporal feature can be implemented, and high calculation costs can be avoided.

Figure 4:
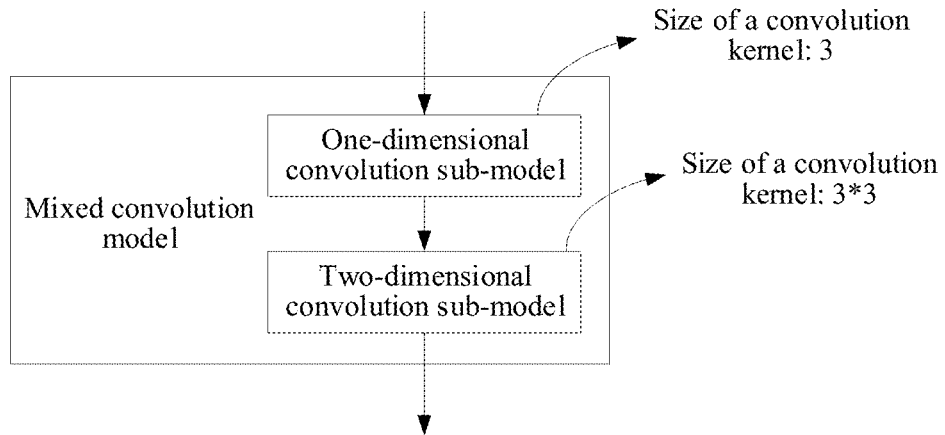
FIG. 4 is a schematic structural diagram of a mixed convolution model according to an embodiment of this application.

In an actual application, for example, an initially mixed convolution model may be determined. The initially mixed convolution model includes a one-dimensional convolution sub-model in a temporal dimension, a size of a convolution kernel of the one-dimensional convolution sub-model being 3, and a two-dimensional convolution sub-model in a spatial dimension, a size of a convolution kernel of the two-dimensional convolution sub-model being 3*3. Because the image feature has been divided into the plurality of image sub-features according to the plurality of channels, correspondingly, the initially mixed convolution model needs to be also divided into a plurality of mixed convolution models according to the plurality of channels, that is, the initially mixed convolution model is divided into the plurality of convolution models based on grouped convolution. The size of the convolution kernel does not change after grouped convolution is used. Therefore, as shown in FIG. 4, the mixed convolution model includes a one-dimensional convolution sub-model in a temporal dimension, a size of a convolution kernel of the one-dimensional convolution sub-model being 3, and a two-dimensional convolution sub-model in a spatial dimension, a size of a convolution kernel of the two-dimensional convolution sub-model being 3*3.

The size of the convolution kernel of the one-dimensional convolution sub-model in the initially mixed convolution model is 3, and a quantity of parameters of the initially mixed convolution model is C*C*3 for an image feature with C channels. The size of the convolution kernel of the two-dimensional convolution sub-model in the initially mixed convolution model is 3×3, and a quantity of parameters of the initially mixed convolution model is C*C*3*3 for the image feature with the C channels. Because the size of the convolution kernel does not change when grouped convolution is used, the size of the convolution kernel of the one-dimensional convolution sub-model in the mixed convolution model is still 3. However, a quantity of parameters of the mixed convolution model is $$\frac{C}{4} \times \frac{C}{4} \times 3$$

for an image sub-feature with $$\frac{C}{4}$$

channels. The size of the convolution kernel of the two-dimensional convolution sub-model in the mixed convolution model is still 3×3. However, a quantity of parameters of the mixed convolution model is $$\frac{C}{4} \times \frac{C}{4} \times 3 \times 3$$

for the image sub-feature with the $$\frac{C}{4}$$

channels. After the divided mixed convolution model is obtained, convolution processing may be performed on the initial image sub-feature by using the mixed convolution model, to obtain the convolved image sub-feature.

In an embodiment, after the mixed convolution models are obtained, convolution processing may be respectively performed on features by using one-dimensional convolution sub-models and two-dimensional convolution sub-models. Specifically, the steps of "performing convolution processing on the initial image sub-feature based on the mixed convolution model, to obtain the convolved image sub-feature" may include:

performing convolution processing on the initial image sub-feature in a temporal dimension based on the one-dimensional convolution sub-model, to obtain a temporally convolved image sub-feature; and performing convolution processing on the temporally convolved image sub-feature in a spatial dimension based on the two-dimensional convolution sub-model, to obtain the convolved image sub-feature.

In an actual application, for example, the initial image sub-feature is an image sub-feature X2, and sizes of feature dimensions are $$\left[T, \frac{C}{4}, H, W\right].$$

The feature dimensions $$\left[T, \frac{C}{4}, H, W\right]$$

may be recombined into $$\left[H, W, \frac{C}{4}, T\right],$$

and then a temporal dimension T of the image sub-feature X2 is processed by using a one-dimensional convolution sub-model with a convolution kernel of a size of 3, to obtain a temporally convolved image sub-feature. A quantity of parameters of a convolution operator is $$\frac{C}{4} \times \frac{C}{4} \times 3.$$

In this process, spatial information of the image sub-feature X2 is ignored, and it may be considered that the image sub-feature X2 includes T frames of feature information in total, and a feature dimension of each frame is $$\frac{C}{4}.$$

Convolution processing is performed in the temporal dimension by using the convolution kernel with the size of 3, which is equivalent to performing information fusion on a video frame t, and a video frame t−1 as well as a video frame t+1 adjacent to the video frame t.

Subsequently, the feature dimensions $$\left[H, W, \frac{C}{4}, T\right]$$

of the temporally convolved image sub-feature are recombined into $$\left[T, \frac{C}{4}, H, W\right],$$

and a spatial dimension (H, W) of the temporally convolved image sub-feature is processed by using the two-dimensional convolution sub-model with the convolution kernel of the size of 3*3, to obtain a convolved image sub-feature. A quantity of parameters of a convolution operator is $$\frac{C}{4} \times \frac{C}{4} \times 3 \times 3.$$

In this process, temporal information of the temporally convolved image sub-feature is ignored, and it may be considered that the temporally convolved image sub-feature includes features of H*W pixels, and a dimension of a feature of each pixel is $$\frac{C}{4}.$$

In this process, spatial feature fusion is performed on each pixel in the spatial dimension and pixels in adjacent 3*3 space regions. Finally, the feature dimensions are recovered from $$\left[H, W, \frac{C}{4}, T\right] \text{ to } \left[T, \frac{C}{4}, H, W\right],$$

and the convolved image sub-feature is obtained.

The quantity of parameters is C*C*3 when convolution operation is performed once by using the one-dimensional convolution sub-model in the initially mixed convolution model, but the quantity of parameters is $$\frac{C}{4} \times \frac{C}{4} \times 3$$

when convolution operation is performed once by using the one-dimensional convolution sub-model in the mixed convolution model. Therefore, in this embodiment of this application, a total quantity of parameters is $$3 \times \left(\frac{C}{4} \times \frac{C}{4} \times 3\right)$$

when three times of convolution operations are performed. The quantity of parameters is reduced compared with that when the initially mixed convolution model is directly used, but features within a longer time range can be fused, and temporal information of a video is considered and determined more completely.

In an embodiment, for example, during convolution processing, the size of the convolution kernel may be adjusted according to an actual application condition. In another example, during convolution processing, convolution kernels corresponding to a plurality of image sub-features may alternatively have difference sizes. That is, convolution processing may be performed on different image sub-feature by using convolution kernels with different sizes, to comprehensively consider a modeling capability in different time scales.

S205. Splice a plurality of convolved image sub-features based on a plurality of channels of the convolved image sub-features, to obtain a spliced image feature.

In an actual application, for example, after a convolved image sub-feature corresponding to each image sub-feature is obtained, a plurality of convolved image sub-features may be spliced according to channels, to obtain a spliced image feature.

In an embodiment, more accurate features are expected to be obtained. Therefore, an original image sub-feature that needs to be reserved may be further determined from the plurality of image sub-features, so that an unprocessed feature can be reserved from a finally obtained spliced image. Specifically, the step of "splicing a plurality of convolved image sub-features based on a plurality of channels of the convolved image sub-features, to obtain a spliced image feature" may include:

determining a reserved original image sub-feature from the plurality of image sub-features based on the preset sequence; and splicing the plurality of convolved image sub-features and the original image sub-feature based on the plurality of channels of the convolved image sub-features, to obtain the spliced image feature.

In an actual application, for example, as shown in FIG. 9, the image sub-feature X1 may be determined as an original image sub-feature that needs to be reserved from the image sub-feature X1, the image sub-feature X2, the image sub-feature X3, and the image sub-feature X4 that are arranged in sequence. The convolved image sub-feature $X_2^0$ corresponding to the image sub-feature X2, the convolved image sub-feature $X_3^0$ corresponding to the image sub-feature X3, and the convolved image sub-feature $X_4^0$ corresponding to the image sub-feature X4 that are obtained and the image sub-feature X1 (that is, $X_1^0$) are spliced, to obtain a spliced image feature $X^0$. The features for splicing have difference receptive fields. Because convolution processing is not performed on the image sub-feature X1, a receptive field of the image sub-feature X1 is not expanded. Convolution processing is performed on the image sub-feature X2 once, and a receptive field of the image sub-feature X2 is expanded once. Convolution processing is performed on the image sub-feature X3 twice, and a receptive field of the image sub-feature X3 is expanded twice. Three times of convolution processing are performed on the image sub-feature X4, and a receptive field of the image sub-feature X4 is expanded three times.

Figure 6:
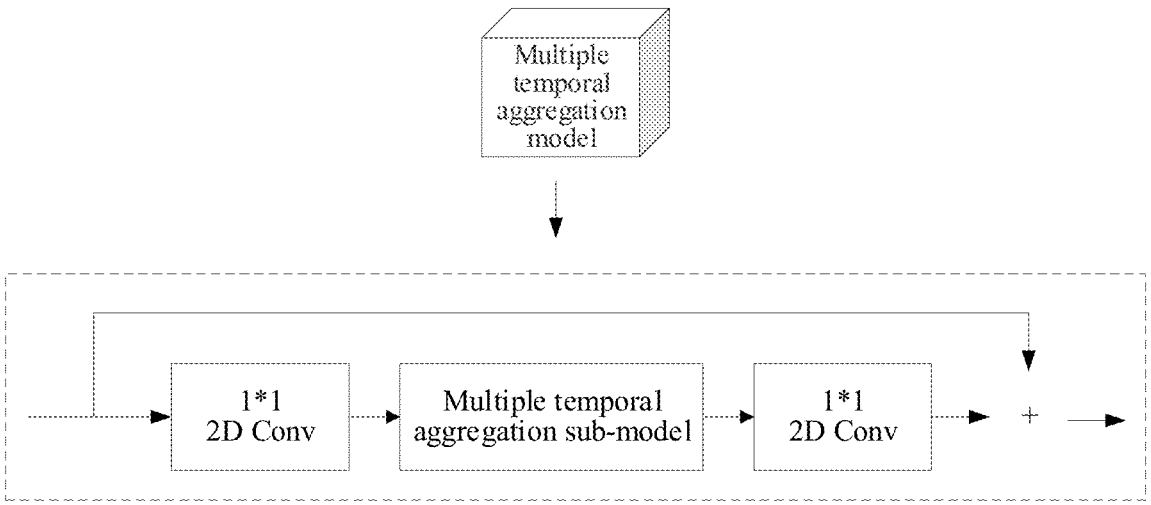
FIG. 6 is a schematic structural diagram of a model structure of a multiple temporal aggregation model according to an embodiment of this application.

In an embodiment, the operation of obtaining a spliced image feature according to the image feature may be completed by using a multiple temporal aggregation model. As shown in FIG. 6, the multiple temporal aggregation includes a multiple temporal aggregation sub-model and a two-dimensional convolutional layer having two convolution kernels with a size of 1×1. The multiple temporal aggregation sub-model may implement the operations of dividing the image feature into a plurality of image sub-features based on a plurality of channels of the image feature; determining image sub-features from the plurality of image sub-features based on the preset sequence; fusing a current image sub-feature and a convolution processing result of a previous image sub-feature, and performing convolution processing on a fused image feature, to obtain a convolved image sub-feature corresponding to each image sub-feature; and splicing a plurality of convolved image sub-features based on a plurality of channels of the convolved image sub-features, to obtain a spliced image feature.

Figure 5:
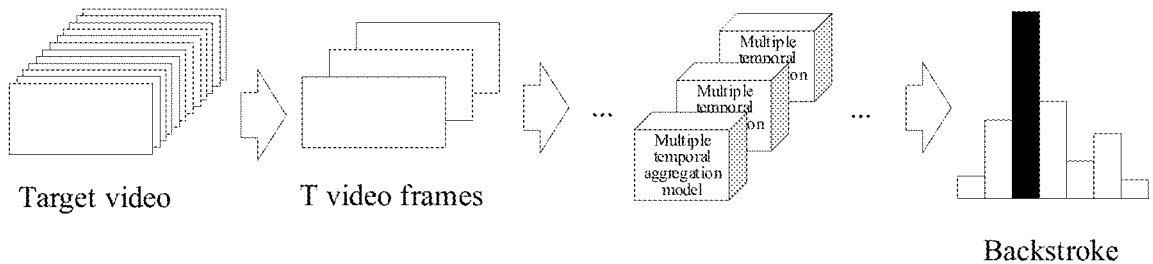
FIG. 5 is a flowchart of predicting video content corresponding to a target video according to an embodiment of this application.

That is, the image feature is inputted into a temporal information aggregation module, to obtain an outputted spliced image feature. As shown in FIG. 5, in this embodiment of this application, a plurality of multiple temporal aggregation (MTA) modules may be further stacked, to achieve a stronger and stabler long-time information modeling capability.

In an embodiment, this embodiment of this application may further include a process of training the MTA module. For example, an image feature corresponding to a target sample video as a training sample may be represented as X', and sizes of feature dimensions of the image feature are [N, T', C', H', W']. N represents a size of a training batch during training, T' represents a temporal dimension, that is, there are T' video frames in a video frame set in total, C' represents a quantity of channels, and H' and W' represent a spatial dimension of the feature. The image feature X' may be inputted into an untrained MTA module, predicted video content of the target sample video is obtained through prediction, and the untrained MTA module is trained based on actually known video content of the target sample video, to obtain the MTA module. The entire training process is end to end, and the training of the MTA module and learning of a spatial-temporal feature of a video are performed at the same time.

S206. Determine video content corresponding to the target video based on the spliced image feature.

In an actual application, for example, an objective of this embodiment of this application is to recognize video content corresponding to a target video. Therefore, after a spliced image feature is obtained, the spliced image feature may continue to be processed, a prediction score corresponding to each video frame in the video frame set is obtained through prediction, and then prediction scores of a plurality of video frames are averaged by using a time averaging policy, to obtain a final prediction of the entire target video.

In an embodiment, specifically, the step of "determining video content corresponding to the target video based on the spliced image feature" may include:

obtaining, through prediction, a content prediction probability corresponding to each video frame in the video frame set based on the spliced image feature;

fusing content prediction probabilities corresponding to a plurality of video frames, to obtain a video content prediction probability corresponding to the target video; and determining the video content corresponding to the target video based on the video content prediction probability.

In an actual application, for example, as shown in FIG. 5, a content prediction probability corresponding to each video frame in the video frame set may be predicted according to the spliced image feature. It can be learned according to a content prediction probability corresponding to a video frame that a possibility of each video content is described in the video frame. Subsequently, content prediction probabilities corresponding to a plurality of video frames are fused by using the time averaging policy, to obtain a video content prediction probability corresponding to the target video. A bar graph may be then constructed correspondingly according to the video content prediction probability, and video content with a maximum probability is determined as the video content "backstroke" corresponding to the target video.

In an actual application, according to the video content recognition method provided in this embodiment of this application, a spliced image feature fused with features within a long time range may be obtained. Therefore, as a basic video understanding technology, subsequent operations such as deduplication and personalized recommendation may be performed by using the spliced image feature fused with the features within the long time range. According to the video content recognition method provided in this embodiment of this application, video content of a target video may be further recognized. Therefore, the video content recognition method may be further used in a specific video application scenario, for example, may be used in a scenario of checking and filtering videos including politics, violence, pornography, or the like.

It can be learned from the above that, in this embodiment of this application, a video frame set may be obtained from a target video, and an image feature corresponding to the video frame set is extracted, the video frame set including at least two video frames; the image feature is divided into a plurality of image sub-features based on a plurality of channels of the image feature, the plurality of image sub-features being arranged according to a preset sequence, and each image sub-feature including a feature of each video frame on a corresponding channel; image sub-features are determined from the plurality of image sub-features based on the preset sequence, a current image sub-feature and a convolution processing result of a previous image sub-feature are fused, and convolution processing is performed on a fused image feature, to obtain a convolved image sub-feature corresponding to each image sub-feature; and a plurality of convolved image sub-features are spliced based on a plurality of channels of the convolved image sub-features, to obtain a spliced image feature, and video content corresponding to the target video is determined based on the spliced image feature. Through this solution, an initially mixed convolution model may be split into a plurality of mixed convolution models, and every two mixed convolution models are connected by a residual connection simultaneously, so that the plurality of mixed convolution models form a hierarchical structure. A receptive field in a temporal dimension is expanded after a plurality of times of convolution processing are performed on a video feature, and a correlation between each frame of video feature and a distant video frame can be effectively established. In addition, neither an additional parameter nor complex calculation is added by using this method, to improve video content recognition efficiency.

According to the method described in the foregoing embodiment, detailed descriptions are further provided below by using an example in which the video content recognition apparatus is specifically integrated into a network device.

Figure 3:
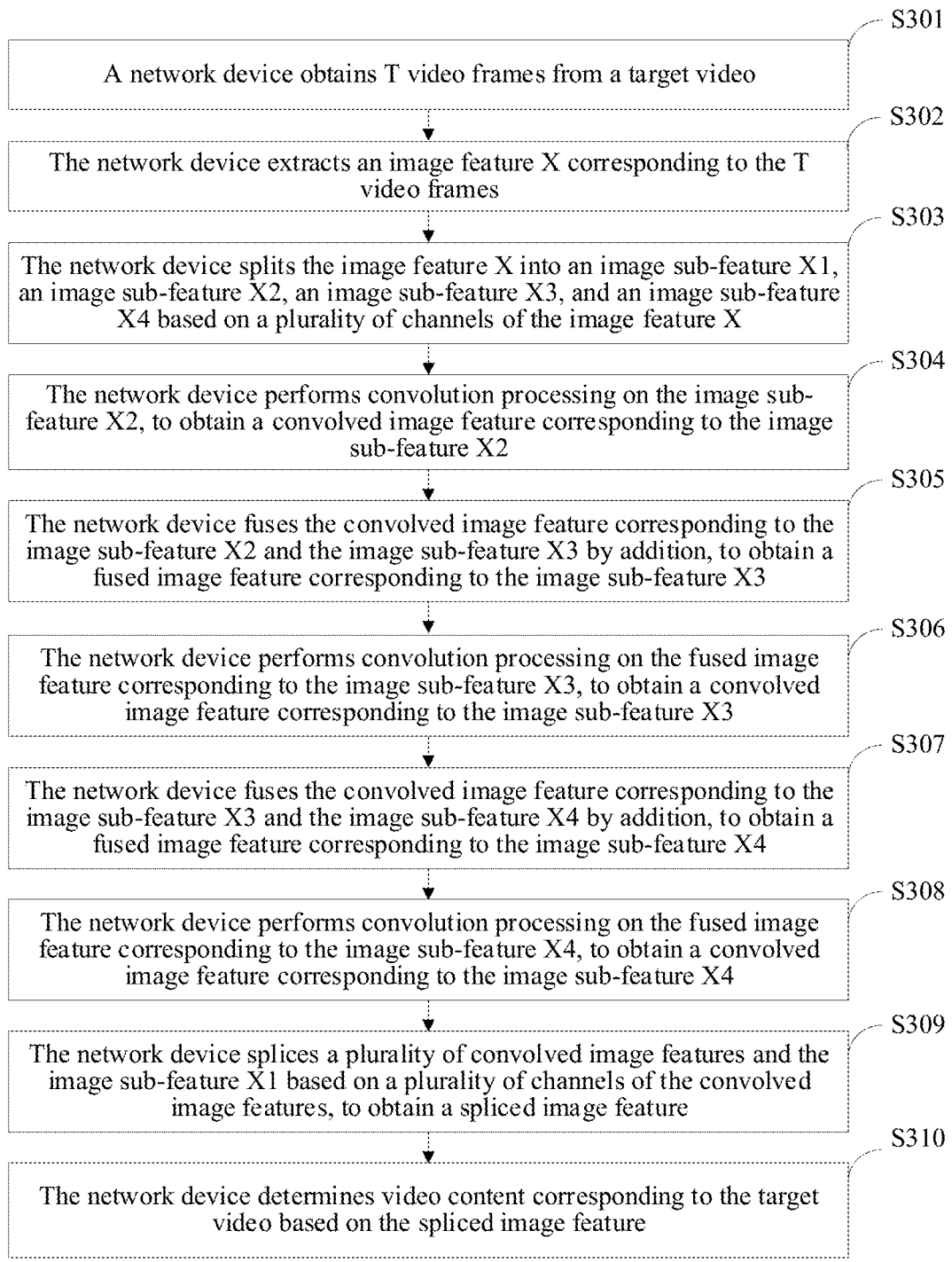
FIG. 3 is a flowchart of a video content recognition method according to another embodiment of this application.

FIG. 3 is a flowchart of a video content recognition method according to an embodiment of this application. Specifically:

S301. A network device obtains T video frames from a target video.

In an actual application, for example, as shown in FIG. 5, a network device may divide a target video into T target sub-videos on average through sparse sampling. Subsequently, random sampling is performed on each target sub-video, to obtain a video frame corresponding to each target sub-video, so as to convert the target video without a fixed duration into a video frame sequence with a fixed length.

S302. The network device extracts an image feature X corresponding to the T video frames.

In an actual application, for example, the network device may extract an image feature X corresponding to the T video frames through feature extraction such as a plurality of times of convolution. The image feature X includes feature information corresponding to each video frame. [T, C, H, W] may be used for representing sizes of feature dimensions. T represents a temporal dimension, that is, there are T video frames in total, C represents a quantity of channels, and H and W represent a spatial dimension of the feature.

S303. The network device split the image feature X into an image sub-feature X1, an image sub-feature X2, an image sub-feature X3, and an image sub-feature X4 based on a plurality of channels of the image feature X.

Figure 7:
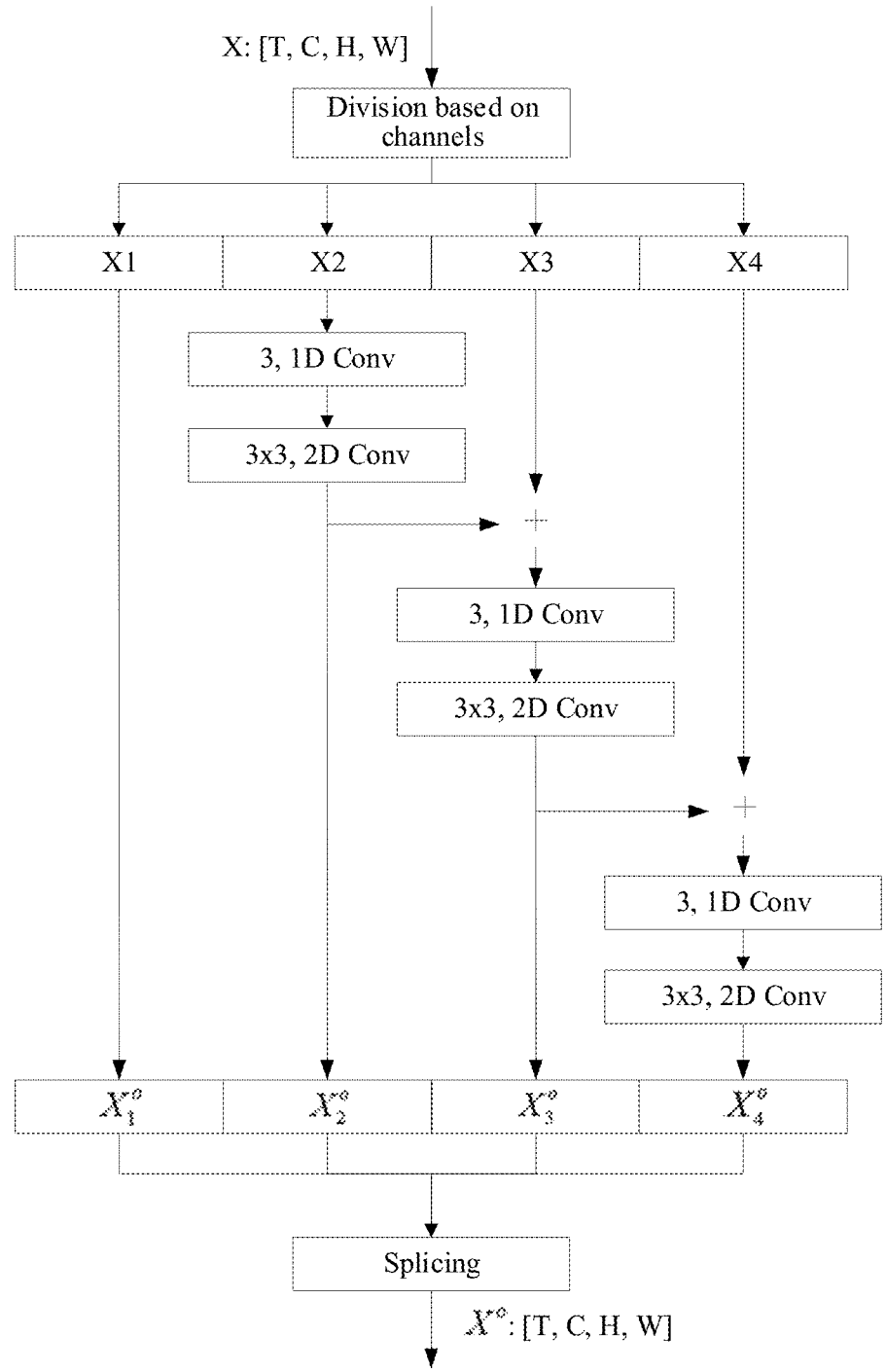
FIG. 7 is a schematic logic diagram of a multiple temporal aggregation sub-model according to an embodiment of this application.

In an actual application, for example, as shown in FIG. 7, the network device may divide the image feature X into four image sub-features according to a plurality of channels of the image feature X, which are an image sub-feature X1, an image sub-feature X2, an image sub-feature X3, and an image sub-feature X4. Feature dimensions corresponding to each image sub-feature are changed into $$\left[T, \frac{C}{4}, H, W\right].$$

In addition, an initially mixed convolution model may be determined. The initially mixed convolution model includes a one-dimensional convolution sub-model in a temporal dimension and a two-dimensional convolution sub-model in a spatial dimension. Because the image feature has been divided into the plurality of image sub-features according to the plurality of channels, correspondingly, the initially mixed convolution model needs to be also divided into a plurality of mixed convolution models according to the plurality of channels.

The size of the convolution kernel of the one-dimensional convolution sub-model in the initially mixed convolution model is 3, and a quantity of parameters of the initially mixed convolution model is C*C*3 for an image feature with C channels. The size of the convolution kernel of the two-dimensional convolution sub-model in the initially mixed convolution model is 3×3, and a quantity of parameters of the initially mixed convolution model is C*C*3*3 for the image feature with the C channels. Because the size of the convolution kernel does not change when grouped convolution is used, the size of the convolution kernel of the one-dimensional convolution sub-model in the mixed convolution model is still 3. However, a quantity of parameters of the mixed convolution model is $$\frac{C}{4} \times \frac{C}{4} \times 3$$

for an image sub-feature with $$\frac{C}{4}$$

channels. The size of the convolution kernel of the two-dimensional convolution sub-model in the mixed convolution model is still 3×3.

However, a quantity of parameters of the mixed convolution model is $$\frac{C}{4} \times \frac{C}{4} \times 3 \times 3$$

for the image sub-feature with the $$\frac{C}{4}$$

channels.

S304. The network device performs convolution processing on the image sub-feature X2, to obtain a convolved image sub-feature corresponding to the image sub-feature X2.

In an actual application, for example, as shown in FIG. 7, sizes of feature dimensions of the image sub-feature X2 are $$\left[T, \frac{C}{4}, H, W\right].$$

The network device may recombine the feature dimensions $$\left[T, \frac{C}{4}, H, W\right] \text{ into } \left[H, W, \frac{C}{4}, T\right],$$

and then process a temporal dimension T of the image sub-feature X2 by using a one-dimensional convolution sub-model with a convolution kernel of a size of 3, to obtain a temporally convolved image sub-feature. A quantity of parameters of a convolution operator $$\frac{C}{4} \times \frac{C}{4} \times 3.$$

is Subsequently, the feature dimensions $$\left[H, W, \frac{C}{4}, T\right]$$

of the temporally convolved image sub-feature are recombined into $$\left[T, \frac{C}{4}, H, W\right],$$

and a spatial dimension (H, W) of the temporally convolved image sub-feature is processed by using the two-dimensional convolution sub-model with the convolution kernel of the size of 3*3, to obtain a convolved image sub-feature. A quantity of parameters of a convolution operator is $$\frac{C}{4} \times \frac{C}{4} \times 3 \times 3.$$

Finally, the feature dimensions may be recovered from $$\left[H, W, \frac{C}{4}, T\right] \text{ to } \left[T, \frac{C}{4}, H, W\right],$$

and the convolved image sub-feature $X_2^0$ corresponding to the image sub-feature X2 is obtained.

S305. The network device fuses the convolved image sub-feature corresponding to the image sub-feature X2 and the image sub-feature X3 by addition, to obtain a fused image feature corresponding to the image sub-feature X3.

S306. The network device performs convolution processing on the fused image feature corresponding to the image sub-feature X3, to obtain a convolved image sub-feature corresponding to the image sub-feature X3.

S307. The network device fuses the convolved image sub-feature corresponding to the image sub-feature X3 and the image sub-feature X4 by addition, to obtain a fused image feature corresponding to the image sub-feature X4.

S308. The network device performs convolution processing on the fused image feature corresponding to the image sub-feature X4, to obtain a convolved image sub-feature corresponding to the image sub-feature X4.

S309. The network device splices a plurality of convolved image sub-features and the image sub-feature X1 based on a plurality of channels of the convolved image sub-features, to obtain a spliced image feature.

In an actual application, for example, as shown in FIG. 7, the network device may splice the convolved image sub-feature $X_2^0$ corresponding to the image sub-feature X2, the convolved image sub-feature $X_2^0$ corresponding to the image sub-feature X3, the convolved image sub-feature $X_4^0$ corresponding to the image sub-feature X4, and the image sub-feature X1 (that is, $X_1^0$) based on a plurality of channels of the convolved image sub-features, to obtain a spliced image feature $X^0$. Subsequently, the features continue to be processed by using a plurality of stacked MTA modules, to achieve a stronger and stabler long-time information modeling capability.

S310. The network device determines video content corresponding to the target video based on the spliced image feature.

In an actual application, for example, the network device may predict content prediction probabilities corresponding to the T video frames according to the spliced image feature. Subsequently, the content prediction probabilities corresponding to the T video frames are fused by using a time averaging policy, to obtain a video content prediction probability corresponding to the target video. A bar graph may be then constructed correspondingly according to the video content prediction probability, and video content with a maximum probability is determined as the video content corresponding to the target video.

It can be learned from the above that in this embodiment of this application, a network device may obtain T video frames from a target video; extract an image feature X corresponding to the T video frames; split the image feature X into an image sub-feature X1, an image sub-feature X2, an image sub-feature X3, and an image sub-feature X4 based on a plurality of channels of the image feature X; perform convolution processing on the image sub-feature X2, to obtain a convolved image sub-feature corresponding to the image sub-feature X2; fuse the convolved image sub-feature corresponding to the image sub-feature X2 and the image sub-feature X3 by addition, to obtain a fused image feature corresponding to the image sub-feature X3; perform convolution processing on the fused image feature corresponding to the image sub-feature X3, to obtain a convolved image sub-feature corresponding to the image sub-feature X3; fuse the convolved image sub-feature corresponding to the image sub-feature X3 and the image sub-feature X4 by addition, to obtain a fused image feature corresponding to the image sub-feature X4; perform convolution processing on the fused image feature corresponding to the image sub-feature X4, to obtain a convolved image sub-feature corresponding to the image sub-feature X4; and splice a plurality of convolved image sub-features and the image sub-feature X1 based on a plurality of channels of the convolved image sub-features, to obtain a spliced image feature, and determine video content corresponding to the target video based on the spliced image feature. Through this solution, an initially mixed convolution model may be split into a plurality of mixed convolution models, and every two mixed convolution models are connected by a residual connection simultaneously, so that the plurality of mixed convolution models form a hierarchical structure. A receptive field in a temporal dimension is expanded after a plurality of times of convolution processing are performed on a video feature, and a correlation between each frame of video feature and a distant video frame can be effectively established. In addition, neither an additional parameter nor complex calculation is added by using this method, to improve video content recognition efficiency.

To better implement the foregoing method, an embodiment of this application may further provide a video content recognition apparatus. The video content recognition apparatus may be specifically integrated into a computer device. The computer device may include a server, a terminal, or the like. The terminal may include a mobile phone, a tablet computer, a notebook computer, a personal computer (PC), or the like.

Figure 11:
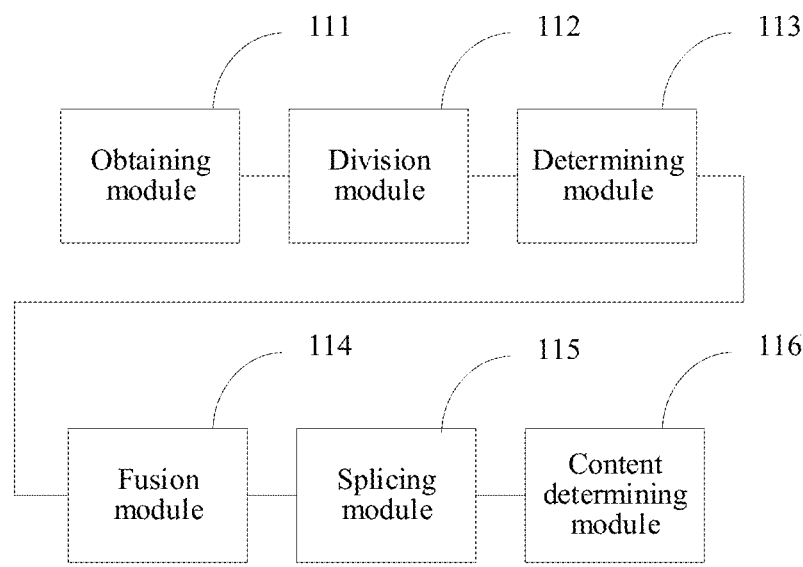
FIG. 11 is a schematic structural diagram of a video content recognition apparatus according to an embodiment of this application.

For example, as shown in FIG. 11, the video content recognition apparatus may include an obtaining module 111, a division module 112, a determining module 113, a fusion module 114, a splicing module 115, and a content determining module 116 as follows.

The obtaining module 111 is configured to obtain a video frame set from a target video, and extract an image feature corresponding to the video frame set, the video frame set including at least two video frames.

The division module 112 is configured to divide the image feature into a plurality of image sub-features based on a plurality of channels of the image feature, the plurality of image sub-features being arranged according to a preset sequence, and each image sub-feature including a feature of each video frame on a corresponding channel.

The determining module 113 is configured to determine image sub-features from the plurality of image sub-features based on the preset sequence.

The fusion module 114 is configured to fuse a current image sub-feature and a convolution processing result of a previous image sub-feature, and perform convolution processing on a fused image feature, to obtain a convolved image sub-feature corresponding to each image sub-feature.

The splicing module 115 is configured to splice a plurality of convolved image sub-features based on a plurality of channels of the convolved image sub-features, to obtain a spliced image feature.

The content determining module 116 is configured to determine video content corresponding to the target video based on the spliced image feature.

In an embodiment, the fusion module 114 may include a first determining submodule, a convolution submodule, a second determining submodule, a fusion submodule, an updating submodule, and a returning submodule as follows.

The first determining submodule is configured to determine an initial image sub-feature from a plurality of image sub-features based on the preset sequence.

The convolution submodule is configured to perform convolution processing on the initial image sub-feature, to obtain a convolved image sub-feature.

The second determining submodule is configured to determine the current image sub-feature from the plurality of image sub-features based on the preset sequence and the initial image sub-feature.

The fusion submodule is configured to fuse the current image sub-feature and the convolved image sub-feature, to obtain a fused image feature.

The updating submodule is configured to update the fused image feature as the initial image sub-feature.

The returning submodule is configured to return to the operation of performing convolution processing on the initial image sub-feature, to obtain a convolved image sub-feature, until the convolved image sub-feature corresponding to each image sub-feature is obtained.

In an embodiment, the splicing submodule 115 may be further configured to:
  determine a reserved original image sub-feature from the plurality of image sub-features based on the preset sequence; and
  splice the plurality of convolved image sub-features and the original image sub-feature based on the plurality of channels of the convolved image sub-features, to obtain the spliced image feature.

In an embodiment, the obtaining module 111 may include a third determining submodule, a division submodule, a construction submodule, and an extraction submodule as follows.

The third determining submodule is configured to determine the target video.

The division submodule is configured to divide the target video into a plurality of target sub-videos.

The construction submodule is configured to obtain a video frame from each target sub-video, and construct the video frame set based on a plurality of video frames.

The extraction submodule is configured to extract features of the video frame set, to obtain the image feature corresponding to the video frame set.

In an embodiment, the division submodule may be further configured to:
  determine a preset image quantity;
  determine a sub-video duration corresponding to each target sub-video based on the preset image quantity and a video duration of the target video; and
  divide the target video into the plurality of target sub-videos based on the sub-video duration.

In an embodiment, the convolution submodule may include a fourth determining submodule, a model division submodule, and a convolution processing submodule as follows.

The fourth determining submodule is configured to determine an initially mixed convolution model.

The model division submodule is configured to divide the initially mixed convolution model into a plurality of mixed convolution models based on the plurality of channels of the image feature.

The convolution processing submodule is configured to perform convolution processing on the initial image sub-feature based on the mixed convolution model, to obtain the convolved image sub-feature.

In an embodiment, the convolution processing submodule may be further configured to:
  perform convolution processing on the initial image sub-feature in a temporal dimension based on the one-dimensional convolution sub-model, to obtain a temporally convolved image sub-feature; and
  perform convolution processing on the temporally convolved image sub-feature in a spatial dimension based on the two-dimensional convolution sub-model, to obtain the convolved image sub-feature.

In an embodiment, the content determining module 116 may be further configured to:
  obtain, through prediction, a content prediction probability corresponding to each video frame in the video frame set based on the spliced image feature;
  fuse content prediction probabilities corresponding to a plurality of video frames, to obtain a video content prediction probability corresponding to the target video; and
  determine the video content corresponding to the target video based on the video content prediction probability.

During specific implementations, the foregoing units may be implemented as independent entities, or may be randomly combined, or may be implemented as the same entity or several entities. For specific implementations of the foregoing units, refer to the foregoing method embodiments. Details are not described herein again.

It can be learned from the above that, in this embodiment of this application, an obtaining module 111 obtains a video frame set from a target video, and extracts an image feature corresponding to the video frame set, the video frame set including at least two video frames; a division module 112 divides the image feature into a plurality of image sub-features based on a plurality of channels of the image feature, the plurality of image sub-features being arranged according to a preset sequence, and each image sub-feature including a feature of each video frame on a corresponding channel; a determining module 113 determines image sub-features from the plurality of image sub-features based on the preset sequence, a fusion module 114 fuses a current image sub-feature and a convolution processing result of a previous image sub-feature, and performs convolution processing on a fused image feature, to obtain a convolved image sub-feature corresponding to each image sub-feature; and a splicing module 115 splices a plurality of convolved image sub-features based on a plurality of channels of the convolved image sub-features, to obtain a spliced image feature, and a content determining module 116 determines video content corresponding to the target video based on the spliced image feature. Through this solution, an initially mixed convolution model may be split into a plurality of mixed convolution models, and every two mixed convolution models are connected by a residual connection simultaneously, so that the plurality of mixed convolution models form a hierarchical structure. A receptive field in a temporal dimension is expanded after a plurality of times of convolution processing are performed on a video feature, and a correlation between each frame of video feature and a distant video frame can be effectively established. In addition, neither an additional parameter nor complex calculation is added by using this method, to improve video content recognition efficiency.

An embodiment of this application further provides a computer device. The computer device may integrate any video content recognition apparatus provided in the embodiments of this application.

Figure 12:
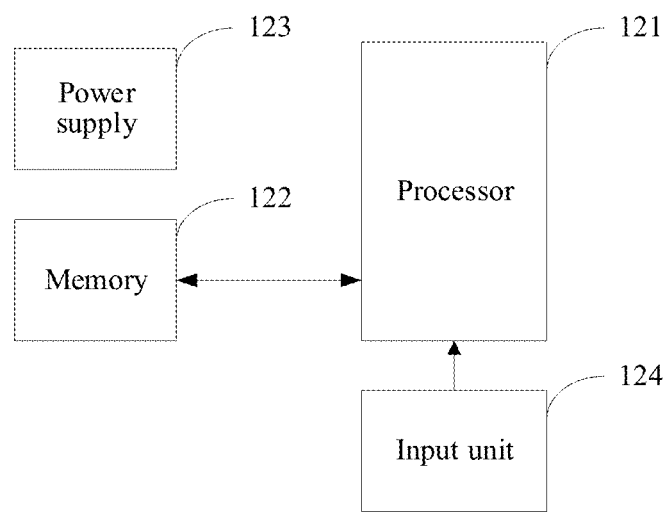
FIG. 12 is a schematic structural diagram of a computer device according to an embodiment of this application.

For example, FIG. 12 is a schematic structural diagram of a computer device according to an embodiment of this application. Specifically, the computer device may include components such as a processor 121 including one or more processing cores, a memory 122 including one or more computer-readable storage media, a power supply 123, and an input unit 124. A person skilled in the art may understand that, the structure of the computer device shown in FIG. 12 does not constitute a limitation to the computer device. The computer device may include components that are more or fewer than those shown in the figure, or some components may be combined, or a different component deployment may be used.

The processor 121 is a control center of the computer device, and is connected to various parts of the entire computer device by using various interfaces and lines. By running or executing computer-readable instructions and/or modules stored in the memory 122, and invoking data stored in the memory 122, the processor performs various functions and data processing of the computer device, thereby performing overall monitoring on the computer device. In some embodiments, the processor 121 may include one or more processing cores. Preferably, the processor 121 may integrate an application processor and a modem processor. The application processor mainly processes an operating system, a user interface, an application program, and the like. The modem processor mainly processes wireless communication. It may be understood that the foregoing modem processor may either not be integrated into the processor 121.

The memory 122 may be configured to store a computer readable instruction and a module, and the processor 121 executes various function applications and performs data processing by running the computer readable instruction and the module that are stored in the memory 122. The memory 122 may mainly include a computer-readable instruction storage area and a data storage area. The computer-readable instruction storage area may store an operating system, an application program required by at least one function (for example, a sound playback function and an image playback function), or the like. The data storage area may store data created according to use of the computer device. In addition, the memory 122 may include a high-speed random access memory, and may further include a nonvolatile memory, such as at least one magnetic disk storage device, a flash memory, or another volatile solid-state storage device. Correspondingly, the memory 122 may further include a memory controller, so that the processor 121 may access the memory 122.

The computer device further includes the power supply 123 supplying power to the components. Preferably, the power supply 123 may be logically connected to the processor 121 by a power management system, thereby implementing functions such as charging, discharging, and power consumption management by using the power management system. The power supply 123 may further include one or more of a direct current or alternating current power supply, a re-charging system, a power failure detection circuit, a power supply converter or inverter, a power supply state indicator, and any other component.

The computer device may further include the input unit 124. The input unit 124 may be configured to receive input digit or character information and generate keyboard, mouse, joystick, optical, or trackball signal input related to user settings and function control.

Although not shown in the figure, the computer device may further include a display unit, and the like. Details are not described herein again. Specifically, in this embodiment, the processor 121 in the computer device may load executable files corresponding to processes of one or more application programs to the memory 122 according to the following computer-readable instructions, and the processor 121 runs the application program stored in the memory 122, to implement various functions as follows.

A video frame set is obtained from a target video, and an image feature corresponding to the video frame set is extracted, the video frame set including at least two video frames; the image feature is divided into a plurality of image sub-features based on a plurality of channels of the image feature, the plurality of image sub-features being arranged according to a preset sequence, and each image sub-feature including a feature of each video frame on a corresponding channel; image sub-features are determined from the plurality of image sub-features based on the preset sequence, a current image sub-feature and a convolution processing result of a previous image sub-feature are fused, and convolution processing is performed on a fused image feature, to obtain a convolved image sub-feature corresponding to each image sub-feature; and a plurality of convolved image sub-features are spliced based on a plurality of channels of the convolved image sub-features, to obtain a spliced image feature, and video content corresponding to the target video is determined based on the spliced image feature.

For specific implementations of the above operations, refer to the foregoing embodiments. Details are not described herein again.

It can be learned from the above that, in this embodiment of this application, a video frame set may be obtained from a target video, and an image feature corresponding to the video frame set is extracted, the video frame set including at least two video frames; the image feature is divided into a plurality of image sub-features based on a plurality of channels of the image feature, the plurality of image sub-features being arranged according to a preset sequence, and each image sub-feature including a feature of each video frame on a corresponding channel; image sub-features are determined from the plurality of image sub-features based on the preset sequence, a current image sub-feature and a convolution processing result of a previous image sub-feature are fused, and convolution processing is performed on a fused image feature, to obtain a convolved image sub-feature corresponding to each image sub-feature; and a plurality of convolved image sub-features are spliced based on a plurality of channels of the convolved image sub-features, to obtain a spliced image feature, and video content corresponding to the target video is determined based on the spliced image feature. Through this solution, an initially mixed convolution model may be split into a plurality of mixed convolution models, and every two mixed convolution models are connected by a residual connection simultaneously, so that the plurality of mixed convolution models form a hierarchical structure. A receptive field in a temporal dimension is expanded after a plurality of times of convolution processing are performed on a video feature, and a correlation between each frame of video feature and a distant video frame can be effectively established. In addition, neither an additional parameter nor complex calculation is added by using this method, to improve video content recognition efficiency.

A person skilled in the art may understand that all or part of the steps in the various methods of the foregoing embodiments may be completed by using the computer readable instruction or completed by using the computer readable instruction to control related hardware. The computer readable instruction may be stored in a computer readable storage medium, loaded and executed by the processor.

To this end, an embodiment of this application provides a computer device storing a plurality of computer-readable instructions, and the computer-readable instructions can be loaded by a processor to perform the operations in any one of the video content recognition methods according to the embodiments of this application. For example, the computer readable instruction may perform the following steps:

obtaining video frame set from a target video, and extracting an image feature corresponding to the video frame set, the video frame set including at least two video frames; dividing the image feature into a plurality of image sub-features based on a plurality of channels of the image feature, the plurality of image sub-features being arranged according to a preset sequence, and each image sub-feature including a feature of each video frame on a corresponding channel; determining image sub-features from the plurality of image sub-features based on the preset sequence, fusing a current image sub-feature and a convolution processing result of a previous image sub-feature, and performing convolution processing on a fused image feature, to obtain a convolved image sub-feature corresponding to each image sub-feature; and splicing a plurality of convolved image sub-features based on a plurality of channels of the convolved image sub-features, to obtain a spliced image feature, and determining video content corresponding to the target video based on the spliced image feature.

For specific implementations of the above operations, refer to the foregoing embodiments. Details are not described herein again.

The storage medium may include a read-only memory (ROM), a random access memory (RAM), a magnetic disk, an optical disc, or the like.

Because the instructions stored in the storage medium may perform the steps of any video content recognition method in the embodiments of this application, the instructions can achieve beneficial effects that may be achieved by any video content recognition method in the embodiments of this application. For details, refer to the foregoing embodiments. Details are not described herein again.

In an embodiment, a computer-readable storage medium is provided, storing computer-readable instructions. The computer-readable instructions, when executed by the processor, cause the processor to perform the operations in the foregoing video content recognition method. The operations of the video content recognition method herein may be the operations of the video content recognition method in the foregoing embodiments.

In an embodiment, a computer program product or a computer-readable instruction is provided, the computer program product or the computer-readable instruction includes computer-readable instructions, and the computer-readable instructions are stored in the computer-readable storage medium. The processor of the computer device reads the computer-readable instructions from the computer-readable storage medium, and the processor executes the computer-readable instructions, to cause the computer device to perform the steps in the method embodiments.

The video content recognition method and apparatus, the storage medium, and the electronic device provided in the embodiments of this application are described in detail above. The principles and implementations of this application are described through specific examples in this specification, and the descriptions of the embodiments are only intended to help understand the methods and core ideas of this application. Meanwhile, a person of ordinary skill in the art may make modifications to the specific implementations and application scopes according to the ideas of the present disclosure. In conclusion, the content of the specification is not to be construed as a limitation to the present disclosure.

What is claimed is:

1. A video content recognition method performed by a computer device, the method comprising:
    obtaining an image feature corresponding to a video frame set extracted from a target video, the video frame set comprising at least two video frames;
    dividing the image feature into a plurality of image sub-features based on a plurality of channels of the image feature according to a preset sequence, and each image sub-feature comprising a feature of each video frame on a corresponding channel;
    choosing, from the plurality of image sub-features based on the preset sequence, a current image sub-feature;
    fusing the current image sub-feature and a convolution processing result of a previous image sub-feature into a fused image sub-feature, and performing convolution processing on the fused image sub-feature, to obtain a convolved image sub-feature corresponding to the current image sub-feature;
    splicing a plurality of convolved image sub-features corresponding to the plurality of channels of the convolved image sub-feature, to obtain a spliced image feature; and
    determining video content corresponding to the target video based on the spliced image feature.

2. The video content recognition method according to claim 1, wherein the fusing the current image sub-feature and a convolution processing result of a previous image sub-feature into a fused image sub-feature, and performing convolution processing on the fused image sub-feature, to obtain a convolved image sub-feature corresponding to the current image sub-feature comprises:
    determining an initial image sub-feature from the plurality of image sub-features based on the preset sequence;
    performing convolution processing on the initial image sub-feature, to obtain a convolved image sub-feature;

determining the current image sub-feature from the plurality of image sub-features based on the preset sequence and the initial image sub-feature;

fusing the current image sub-feature and the convolved image sub-feature, to obtain a fused image sub-feature;

updating the fused image sub-feature as the initial image sub-feature; and repeating the operations of performing convolution processing on the initial image sub-feature, to obtain a convolved image sub-feature, until the convolved image sub-feature corresponding to each of the plurality of image sub-features is obtained.

3. The video content recognition method according to claim 1, wherein the splicing a plurality of convolved image sub-features corresponding to the plurality of channels of the image feature, to obtain a spliced image feature comprises:

determining a reserved original image sub-feature from the plurality of image sub-features based on the preset sequence; and splicing the plurality of convolved image sub-features and the original image sub-feature based on the plurality of channels of the convolved image sub-features, to obtain the spliced image feature.

4. The video content recognition method according to claim 1, wherein the obtaining an image feature corresponding to a video frame set extracted from a target video, the video frame set comprising at least two video frames comprises:

dividing the target video into a plurality of target sub-videos;

extracting a video frame from each of the plurality of target sub-videos into a plurality of video frames as the video frame set; and extracting features of the video frame set as the image feature corresponding to the video frame set.

5. The video content recognition method according to claim 4, wherein the dividing the target video into a plurality of target sub-videos comprises:

determining a preset image quantity;

determining a sub-video duration corresponding to each target sub-video based on the preset image quantity and a video duration of the target video; and dividing the target video into the plurality of target sub-videos based on the sub-video duration.

6. The video content recognition method according to claim 2, wherein the performing convolution processing on the initial image sub-feature, to obtain a convolved image sub-feature comprises:

determining an initially mixed convolution model;

dividing the initially mixed convolution model into a plurality of mixed convolution models based on the plurality of channels of the image feature; and performing convolution processing on the initial image sub-feature based on the mixed convolution model, to obtain the convolved image sub-feature.

7. The video content recognition method according to claim 6, wherein the mixed convolution model comprises a one-dimensional convolution sub-model and a two-dimensional convolution sub-model; and the performing convolution processing on the initial image sub-feature based on the mixed convolution model, to obtain the convolved image sub-feature comprises:

performing convolution processing on the initial image sub-feature in a temporal dimension based on the one-dimensional convolution sub-model, to obtain a temporally convolved image sub-feature; and performing convolution processing on the temporally convolved image sub-feature in a spatial dimension based on the two-dimensional convolution sub-model, to obtain the convolved image sub-feature.

8. The video content recognition method according to claim 1, wherein the determining video content corresponding to the target video based on the spliced image feature comprises:

obtaining, through prediction, a content prediction probability corresponding to each video frame in the video frame set based on the spliced image feature;

fusing content prediction probabilities corresponding to a plurality of video frames in the video frame set, to obtain a video content prediction probability corresponding to the target video; and determining the video content corresponding to the target video based on the video content prediction probability.

9. A computer device, comprising a memory and one or more processors, the memory storing computer-readable instructions, and the computer-readable instructions, when executed by the processors, causing the computer device to perform a video content recognition method including:

obtaining an image feature corresponding to a video frame set extracted from a target video, the video frame set comprising at least two video frames;

dividing the image feature into a plurality of image sub-features based on a plurality of channels of the image feature according to a preset sequence, and each image sub-feature comprising a feature of each video frame on a corresponding channel;

choosing, from the plurality of image sub-features based on the preset sequence, a current image sub-feature;

fusing the current image sub-feature and a convolution processing result of a previous image sub-feature into a fused image sub-feature, and performing convolution processing on the fused image sub-feature, to obtain a convolved image sub-feature corresponding to the current image sub-feature;

splicing a plurality of convolved image sub-features corresponding to the plurality of channels of the convolved image sub-feature, to obtain a spliced image feature; and determining video content corresponding to the target video based on the spliced image feature.

10. The computer device according to claim 9, wherein the fusing the current image sub-feature and a convolution processing result of a previous image sub-feature into a fused image sub-feature, and performing convolution processing on the fused image sub-feature, to obtain a convolved image sub-feature corresponding to the current image sub-feature comprises:

determining an initial image sub-feature from the plurality of image sub-features based on the preset sequence;

performing convolution processing on the initial image sub-feature, to obtain a convolved image sub-feature;

determining the current image sub-feature from the plurality of image sub-features based on the preset sequence and the initial image sub-feature;

fusing the current image sub-feature and the convolved image sub-feature, to obtain a fused image sub-feature;

updating the fused image sub-feature as the initial image sub-feature; and repeating the operations of performing convolution processing on the initial image sub-feature, to obtain a convolved image sub-feature, until the convolved image sub-feature corresponding to each of the plurality of image sub-features is obtained.

11. The computer device according to claim 9, wherein the splicing a plurality of convolved image sub-features corresponding to the plurality of channels of the image feature, to obtain a spliced image feature comprises:
  determining a reserved original image sub-feature from the plurality of image sub-features based on the preset sequence; and
  splicing the plurality of convolved image sub-features and the original image sub-feature based on the plurality of channels of the convolved image sub-features, to obtain the spliced image feature.

12. The computer device according to claim 9, wherein the obtaining an image feature corresponding to a video frame set extracted from a target video, the video frame set comprising at least two video frames comprises:
  dividing the target video into a plurality of target sub-videos;
  extracting a video frame from each of the plurality of target sub-videos into a plurality of video frames as the video frame set; and
  extracting features of the video frame set as the image feature corresponding to the video frame set.

13. The computer device according to claim 12, wherein the dividing the target video into a plurality of target sub-videos comprises:
  determining a preset image quantity;
  determining a sub-video duration corresponding to each target sub-video based on the preset image quantity and a video duration of the target video; and
  dividing the target video into the plurality of target sub-videos based on the sub-video duration.

14. The computer device according to claim 10, wherein the performing convolution processing on the initial image sub-feature, to obtain a convolved image sub-feature comprises:
  determining an initially mixed convolution model;
  dividing the initially mixed convolution model into a plurality of mixed convolution models based on the plurality of channels of the image feature; and
  performing convolution processing on the initial image sub-feature based on the mixed convolution model, to obtain the convolved image sub-feature.

15. The computer device according to claim 14, wherein the mixed convolution model comprises a one-dimensional convolution sub-model and a two-dimensional convolution sub-model; and
  the performing convolution processing on the initial image sub-feature based on the mixed convolution model, to obtain the convolved image sub-feature comprises:
  performing convolution processing on the initial image sub-feature in a temporal dimension based on the one-dimensional convolution sub-model, to obtain a temporally convolved image sub-feature; and
  performing convolution processing on the temporally convolved image sub-feature in a spatial dimension based on the two-dimensional convolution sub-model, to obtain the convolved image sub-feature.

16. The computer device according to claim 9, wherein the determining video content corresponding to the target video based on the spliced image feature comprises:
  obtaining, through prediction, a content prediction probability corresponding to each video frame in the video frame set based on the spliced image feature;
  fusing content prediction probabilities corresponding to a plurality of video frames in the video frame set, to obtain a video content prediction probability corresponding to the target video; and
  determining the video content corresponding to the target video based on the video content prediction probability.

17. One or more non-transitory computer-readable storage media storing computer-readable instructions, the computer-readable instructions, when executed by one or more processors of a computer device, causing the computer device to perform a video content recognition method including:
  obtaining an image feature corresponding to a video frame set extracted from a target video, the video frame set comprising at least two video frames;
  dividing the image feature into a plurality of image sub-features based on a plurality of channels of the image feature according to a preset sequence, and each image sub-feature comprising a feature of each video frame on a corresponding channel;
  choosing, from the plurality of image sub-features based on the preset sequence, a current image sub-feature;
  fusing the current image sub-feature and a convolution processing result of a previous image sub-feature into a fused image sub-feature, and performing convolution processing on the fused image sub-feature, to obtain a convolved image sub-feature corresponding to the current image sub-feature;
  splicing a plurality of convolved image sub-features corresponding to the plurality of channels of the convolved image sub-feature, to obtain a spliced image feature; and
  determining video content corresponding to the target video based on the spliced image feature.

18. The non-transitory computer-readable storage media according to claim 17, wherein the fusing the current image sub-feature and a convolution processing result of a previous image sub-feature into a fused image sub-feature, and performing convolution processing on the fused image sub-feature, to obtain a convolved image sub-feature corresponding to the current image sub-feature comprises:
  determining an initial image sub-feature from the plurality of image sub-features based on the preset sequence;
  performing convolution processing on the initial image sub-feature, to obtain a convolved image sub-feature;
  determining the current image sub-feature from the plurality of image sub-features based on the preset sequence and the initial image sub-feature;
  fusing the current image sub-feature and the convolved image sub-feature, to obtain a fused image sub-feature;
  updating the fused image sub-feature as the initial image sub-feature; and
  repeating the operations of performing convolution processing on the initial image sub-feature, to obtain a convolved image sub-feature, until the convolved image sub-feature corresponding to each of the plurality of image sub-features is obtained.

19. The non-transitory computer-readable storage media according to claim 17, wherein the splicing a plurality of convolved image sub-features corresponding to the plurality of channels of the image feature, to obtain a spliced image feature comprises:
  determining a reserved original image sub-feature from the plurality of image sub-features based on the preset sequence; and
  splicing the plurality of convolved image sub-features and the original image sub-feature based on the plurality of channels of the convolved image sub-features, to obtain the spliced image feature.

20. The non-transitory computer-readable storage media according to claim 17, wherein the obtaining an image feature corresponding to a video frame set extracted from a target video, the video frame set comprising at least two video frames comprises:
- dividing the target video into a plurality of target sub-videos;
- extracting a video frame from each of the plurality of target sub-videos into a plurality of video frames as the video frame set; and
- extracting features of the video frame set as the image feature corresponding to the video frame set.

* * * * *